United States Patent
Sim (10) Patent No.: US 11,038,384 B2
(45) Date of Patent: Jun. 15, 2021

(54) MONITORING OF POWER SYSTEMS USING UNMANNED VEHICLE

(71) Applicant: Schweitzer Engineering Laboratories, Inc., Pullman, WA (US)

(72) Inventor: Johnny G Sim, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 16/435,845

(22) Filed: Jun. 10, 2019

(65) Prior Publication Data
US 2020/0389059 A1    Dec. 10, 2020

(51) Int. Cl.
| | | |
|---|---|---|
| H04B 5/00 | (2006.01) |
| H02J 50/80 | (2016.01) |
| G05D 1/10 | (2006.01) |
| G05D 1/00 | (2006.01) |
| H04W 4/029 | (2018.01) |
| H04W 4/44 | (2018.01) |
| H04W 4/80 | (2018.01) |
| B64C 39/02 | (2006.01) |

(52) U.S. Cl.
CPC ............ *H02J 50/80* (2016.02); *B64C 39/024* (2013.01); *G05D 1/0088* (2013.01); *G05D 1/101* (2013.01); *H04W 4/029* (2018.02); *H04W 4/44* (2018.02); *H04W 4/80* (2018.02); *B64C 2201/122* (2013.01)

(58) Field of Classification Search
CPC combination set(s) only.
See application file for complete search history.

(56) References Cited

U.S. PATENT DOCUMENTS

| | | |
|---|---|---|
| 4,635,055 A | 1/1987 | Fernandes |
| 6,205,867 B1 | 3/2001 | Hayes |

(Continued)

FOREIGN PATENT DOCUMENTS

| | | |
|---|---|---|
| WO | 2006050156 | 5/2006 |
| WO | 2015087284 | 6/2015 |

OTHER PUBLICATIONS

ASTROSE® "Power Line Monitoring System for High Voltage and Extra High Voltage Power Lines" Fraunhofer-Institut für Zuverlässigkeit und Mikrointegration IZM, Oct. 2015.

(Continued)

*Primary Examiner* — Kathy W Wang-Hurst
*Assistant Examiner* — Max Mathew
(74) *Attorney, Agent, or Firm* — Fletcher Yoder, P.C.; Bradley W. Schield (57) ABSTRACT

The present application relates to autonomous and/or real-time monitoring of power transmission devices using an unmanned vehicle. The unmanned vehicle may have a modular payload that controls the unmanned vehicle's positioning and orientation. The modular payload may include processing circuitry that controls data acquisition and perform processing of the collected data. Processing of the collected data may include determinations of the type of power transmission device being monitored and/or determinations of the operational status of the power transmission device being monitored. Communication between the autonomous vehicle and/or payload and the power transmission device may be established using radiofrequency data links.

16 Claims, 5 Drawing Sheets

(56) References Cited

U.S. PATENT DOCUMENTS

| | | | | |
|---|---|---|---|---|
| 7,852,837 | B1* | 12/2010 | Au | H04B 3/46 |
| | | | | 370/389 |
| 8,738,318 | B2 | 5/2014 | Spillane | |
| 9,372,172 | B2 | 6/2016 | Cheng | |
| 9,753,080 | B2 | 9/2017 | Andle | |
| 2008/0086222 | A1* | 4/2008 | Kagan | G01D 4/002 |
| | | | | 700/22 |
| 2009/0088990 | A1* | 4/2009 | Schweitzer, III | G01R 19/2513 |
| | | | | 702/58 |
| 2009/0099798 | A1* | 4/2009 | Gong | H02J 3/24 |
| | | | | 702/57 |
| 2009/0243876 | A1 | 10/2009 | Lilien | |
| 2010/0037189 | A1* | 2/2010 | Bickel | G05F 1/70 |
| | | | | 716/136 |
| 2012/0029871 | A1* | 2/2012 | Spillane | H02G 7/00 |
| | | | | 702/158 |
| 2012/0099478 | A1* | 4/2012 | Fu | G05B 19/00 |
| | | | | 370/254 |
| 2012/0137862 | A1* | 6/2012 | Kossett | B25J 11/0025 |
| | | | | 89/1.13 |
| 2013/0205900 | A1* | 8/2013 | Nulty | H02J 3/00 |
| | | | | 73/514.01 |
| 2014/0136140 | A1* | 5/2014 | Chan | G01P 15/00 |
| | | | | 702/141 |
| 2017/0052222 | A1* | 2/2017 | Pasdar | H02H 1/003 |
| 2017/0358929 | A1* | 12/2017 | Koeppe | H02J 13/00028 |
| 2018/0032088 | A1* | 2/2018 | van Cruyningen | G01C 11/08 |
| 2020/0003357 | A1* | 1/2020 | Su | B64C 39/024 |

OTHER PUBLICATIONS

TLM® Conductor Monitor "Real Time Transmission Line Conductor Monitor" Lindsey Manufacturing Company, Mar. 2017.

AE-150™ "PD & Hot Spots Detection and Localization System for Power Transformers" NBD Technologies Inc., Feb. 2017.

Pabuna, Eduardo "Substation Surveillance Using Radio Frequency Interference (RFI) Measurements", Westco Electrical, Nov. 2014.

Guo, Geng, et Al. "Energy Harvesting Devices for High Voltage Transmission Line Monitoring", 2011 IEEE Power and Energy Society General Meeting, Jul. 2011.

Janus, Patrick "Acoustic Emission Properties of Partial Discharges in the Time-Domain and their Applications" 2012.

Siemens "Siemens presents SIEAERO—the next generation of overhead line inspection" Press Release, Nov. 6, 2018.

Siemens "SIEAERO Overhead Line Inspection Service" Siemens AG, Aug. 2018.

Darling Geomatics "UAV Power Line Inspection Services" 2015. retrieved via https://web.archive.org/web/20170117113118/http://www.darlingltd.com/uav-power-line-inspection.html.

Zhang, Yong, et AL "Automatic Power Line Inspection Using UAV Images" MDPI, Remote Sensing Journal, Aug. 10, 2017. available at www.mdpi.com/journal/remotesensing.

Suo, Geng, et Al. "Energy Harvesting Devices for High Voltage Transmission Line Monitoring", 2011 IEEE Power and Energy Society General Meeting, Jul. 2011.

* cited by examiner

MONITORING OF POWER SYSTEMS USING UNMANNED VEHICLE

FIELD OF DISCLOSURE

The present disclosure relates generally to automated systems for monitoring and diagnostics of power systems.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Power delivery systems transport electricity from power plants or power stations to electricity consumers, such as residences, commercial locations, or manufacturing plants. Power delivery systems may include power transmission grids and/or power distribution grids to connect geographically separated consumers and suppliers. To that end, the transmission grids and/or distribution grids may include power lines, transformer stations, or other power system devices, which may be located in remote areas.

BRIEF DESCRIPTION

Certain examples commensurate in scope with the originally claimed subject matter are discussed below. These examples are not intended to limit the scope of the disclosure. Indeed, the present disclosure may encompass a variety of forms that may be similar to or different from the examples set forth below.

In accordance with an example, a payload device is described. The payload device may have processing circuitry and memory to perform computations. The payload device may include a communication system that may be used to communicate with intelligent electronic devices (IEDs). The memory may include a dataset of IEDs that may include identifiers. During operation, instructions in the memory may cause the processing circuitry to identify and establish data link with an IED. The processing circuitry may collect monitoring data over the data link. The processing circuitry may determine a diagnostic control command based on the monitoring data, the power device dataset, and the type of IED with which the payload established the data link. The processing circuitry may then transmit the diagnostic control command to the IED.

In accordance with another example, an unmanned aircraft is described. The unmanned aircraft may have processing circuitry and memory to perform computations. The payload device may also include a communication system that is configured with one or more protocols to exchange data with IEDs. The memory may include a dataset of power devices with control commands for IEDs. The memory of the unmanned aircraft may also include instructions that cause the processing circuitry to identify an IED, establish a radiofrequency (RF) link with the IED, and collect monitoring data over the RF link. The instructions in the memory may cause the processor to determine a diagnostic command based on the power device dataset and the monitoring data, and to transmit the diagnostic command to the IED.

In accordance with another example, a method for monitoring power transmission networks using an unmanned aircraft is described. The method includes selecting a power device to be monitored from a power device dataset in a memory of the unmanned aircraft. The method includes determining a target geolocation based on the geolocation data of the power device obtained from the memory of the unmanned aircraft. The method includes positioning the unmanned aircraft in the target geolocation using the processing circuitry and a positioning system (e.g., global positioning system (GPS)) of the unmanned aircraft. The method includes collecting monitoring data from the power device using a communication system of the unmanned aircraft by establishing a radiofrequency connection between the communication system and the power device. The method includes determining a state of the power device based on the collected power device and the power device dataset. The performance of the methods in this example may take place autonomously, i.e., without human intervention.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, not all features of an actual implementation may be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase a "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Power systems may include several installations of power distribution systems and power transmission systems connecting suppliers and consumers located in geographically distant areas. The installations may have one or more intelligent electronic devices (IEDs). Examples of IEDs include, but are not limited to, protection relays, recloser circuits, recloser controllers, distribution controllers, power meters, cable fault indicators, overhead fault indicators, underground fault indicators, fault-and-load transmitter and receivers, and other similar systems. Certain IEDs may have radio frequency (RF) communication capabilities and data processing capabilities (e.g., via one or more processors or microprocessors). In some power distribution systems or power transmission systems, the IEDs may be used to perform local control in a portion of the power distribution system or power transmission system. As an example, pole-mounted recloser controls or relays may manage reclosers or circuit breakers located in the vicinity of the controller. As another example, a fault-and-load receiver may be capable of receiving data from neighboring fault-and-load sensors from power lines. As such, communication with the IEDs of a power system may facilitate its management and maintenance.

Owing to geographical separation between installations, regular communication with the IEDs may be particularly challenging and may demand coverage of regions that may be distant from manned facilities. As a result, data from IEDs along a power transmission system and/or power distribution system may not be received regularly. Moreover, certain IEDs may be located in portions with difficult or hazardous access, particularly during inclement weather or due other hazardous conditions. In such situations, access to data might be limited during a period in which such data can be mission critical.

Accordingly, disclosed herein are systems and methods for performing monitoring and/or diagnostic of IEDs and/or electrical equipment using unmanned aircrafts, unmanned automobiles, unmanned boats, and/or unmanned submarines, or other unmanned vehicles. As such, references to unmanned aircrafts in the present application are intended to encompass any suitable unmanned device. Embodiments of the unmanned vehicles described herein may be capable of performing autonomous and/or real time operation and diagnostics. To that end, the unmanned vehicles may carry a payload that is capable of monitoring and/or controlling IEDs. In some embodiments, the payload may communicate with the IEDs using an RF system to perform monitoring and/or control.

In general, the payload on board the unmanned vehicle may perform, among other things, identification of faulty equipment or a fault in the power system (e.g., a line-to-ground fault, a line-to-line fault, a double-line-to-ground fault), identification of location of the fault or faulty equipment, and/or processing to identify specific type of the fault or faulty equipment. The payload may identify the faulty equipment or the specific type of fault in the power system through data acquisition, which may be wireless, from IEDs. To that end, the payload may include RF circuitry and processing circuitry that allows communication with IEDs. In some embodiments, the RF circuitry may be connected to protocol circuitry in the payload that may facilitate communication with the IEDs. For example, the protocol circuitry may be compliant with a Generic Substation Events (GSE) control model and, thus, may be capable of exchanging Generic Object Oriented Substation Events (GOOSE) and/or Generic Substation State Events (GSSE) data. The protocol circuitry may be compliant with other substation protocols and/or other substation data types as specified, for example, in the International Electrotechnical Commission (IEC) standard IEC 61850. In some embodiments, the protocol circuitry may include security specifications and/or tools that secure the wireless communication between the payload and the IEDs.

In some embodiments, the payload may be capable of performing monitoring functionality using visual methods. To that end, the payload may include cameras, depth sensors, positioning systems, and/or orientation systems. The payload may include a database or a dataset with the geographical distribution of equipment to facilitate the identification of the faulty equipment and/or the type of fault. The payload may include a database or a dataset with reference data to facilitate identification of the type of fault. In some situations, the payload may employ visual methods in conjunction with RF communication to perform monitoring and/or control.

The monitoring payloads discussed herein may include coupling structures for modular connection to unmanned vehicles and, in some embodiments, may include positioning actuators to create a relative position between the payload and the unmanned vehicle for proper performance of the monitoring and/or diagnostic tasks. Generally, the operation of the monitoring payload may be described as non-autonomous, autonomous, and/or real time. In the present application, non-autonomous operation refers to operations in which a human user receives data from the monitoring payload and generates instructions for the monitoring payload. Autonomous operation refers to operations in which the system, including the monitoring payload and/or a ground-based system, processes data collected by the monitoring payload without human intervention. Real-time operation refers to operations in which the monitoring payload processes the data locally and determines its strategy without intervention of a ground-based system.

Figure 1:
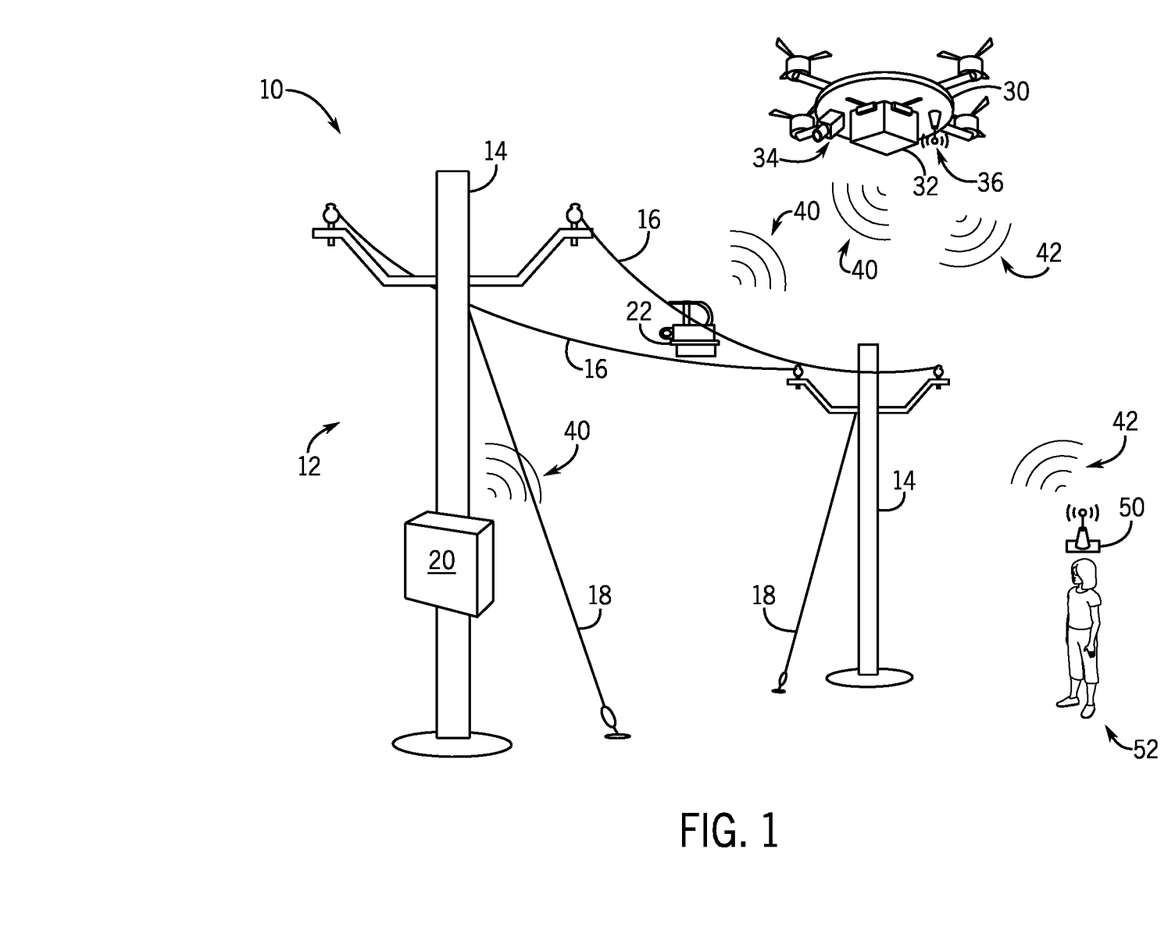
FIG. 1 is a schematic diagram of a power transmission system having intelligent electronic devices (IEDs) that may be monitored and/or controlled using unmanned aircraft payloads, in accordance with an embodiment of the present disclosure.

With the foregoing in mind, FIG. 1 illustrates a power system 10 that includes one or more power transmission lines 12. While a power transmission system is illustrated, note that the following may apply to power distribution systems as well. Power transmission lines 12 may include one or more transmission towers 14 that may support power transmission lines 16. The transmission towers 14 may have support structures, such as metallic lattice structures, a wooden pole structures, guy wires 18 and similar mechanical apparatuses. The power transmission system 10 may have one or more intelligent electronic devices (IEDs), such as an IED 20 attached to the transmission tower 14 and/or an IED 22 attached to the power transmission line 16.

The power transmission system 10 may be inspected by an unmanned aircraft 30 that carries a monitoring payload 32. The monitoring payload 32 may include sensors 34 and communication system 36 capable of communicating with the devices 20 and/or 22. The monitoring payload 32 may be used to monitor and/or perform diagnostics of the IEDs 20 and 22 and/or electrical equipment of the power transmission system 10. To that end, the communication system 36 may include RF circuitry that forms an RF link 40 with the IEDs 20 and/or 22. The communication system 36 may also include protocol circuitry that may parse sensor signals received from the IEDs 20 and 22 and that may generate control signals directed to IEDs 20 and/or 22. For example, the monitoring payload 32 may send diagnostic instructions and receive status information over the RF link 40. As discussed above, the RF link 40 between the payload 32 and the IEDs 20 and/or 22 may be secured by the protocol circuitry of the monitoring payload 32 and/or by corresponding protocol circuitry in the IEDs. Methods for securing the RF link 40 include the use of encryption in the protocol, the use of validation messages (e.g., passwords, passcodes, static signatures), the use of digital signatures (e.g., dynamic signatures, public/private key signatures), or any other protocol-implemented security method.

In some situations, the monitoring payload 32 may process the received data and generate corrective instructions over the RF link 40. For example, if the IED 22 informs that it is presenting a fault that may be corrected, the monitoring payload 32 may generate and send corrective instructions over the RF link 40. Such processing may be performed in real time. In some situations, the corrective instruction may be sent to a second IED. For example, the monitoring payload 32 may sense from the IED 22 a status indicating that the power transmission line 16 is transmitting a current that exceeds its specifications. The monitoring payload 32 may, using the status indication data received from IED 22, request the IED 20 to decrease or halt distribution of power through the power transmission line 16 attached to the IED 22. Such intervention may prevent future damage due to excessive currents, for example.

In some embodiments, the monitoring payload 32 may perform visual monitoring. To that end, sensors 34 may include a positioning sensor and/or a depth sensor to identify the location of the IED and/or electrical equipment being inspected. Sensors 34 may further include a camera to capture visual data, which may facilitate identification of the power transmission device being inspected. With the location data and/or the visual data collected, the monitoring payload 32 can determine the type of IED. For example, the monitoring payload 32 may discriminate between the IED 20 and/or 22. In some situations, an IED may transmit a status information using a visual indication such as light indication (e.g., a color-coded light source, a blinking light source, a dead man light indicator, etc.). The monitoring payload 32 may process data collected from the visual sensor (e.g., sensors 34) and the data used to determine the type of the IED to determine the status message of the IED being monitored.

The processing performed by the monitoring payload 32 may be performed locally, using an embedded processor. In some situations, the monitoring payload 32 may form a network connection 42 with a ground system 50. Network connection 42 may be a long distance wireless connection (e.g., satellite connection, cellular connection). The ground system 50 may remotely control the monitoring payload 32 or the unmanned aircraft 30. The ground system 50 may also be used to provide additional processing power or storage to the monitoring payload 32. To that end, the ground system 50 and the monitoring payload 32 may exchange data collected from the sensors 34 or over the RF link 40. The ground system 50 and the monitoring payload 32 may also exchange corrective instructions to be transmitted to the IEDs 20 and/or 22. In some situations, a human operator 52 may interact with the ground system 50 to control the unmanned aircraft 30 and/or the monitoring payload 32.

Figure 2:
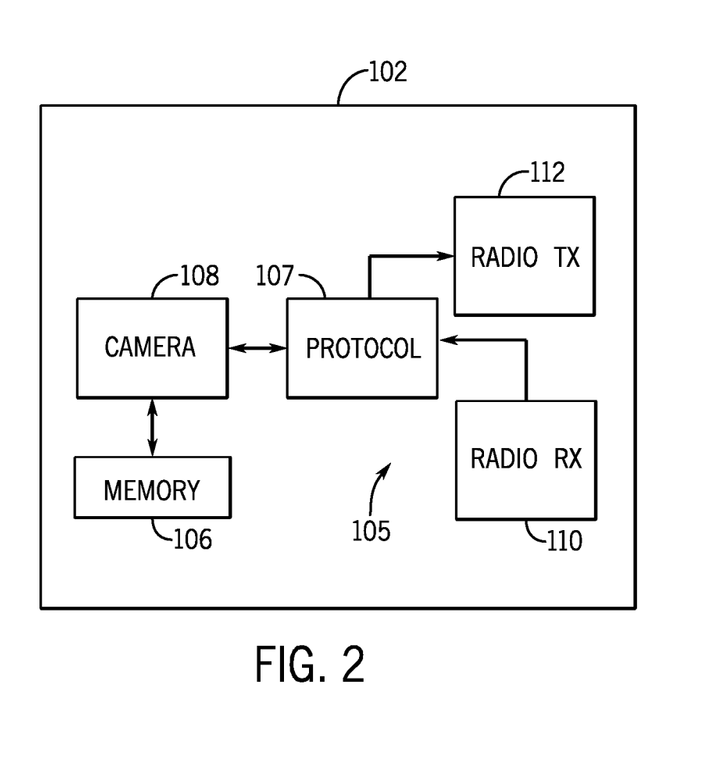
FIG. 2 is a block diagram of a modular diagnostic payload device that may be used in conjunction with unmanned aircrafts to monitor and/or control IEDs, in accordance with an embodiment of the present disclosure.

FIG. 2 provides a block diagram of an embodiment of a monitoring payload 102 that may be used for autonomous operations. The monitoring payload 102 may include a processor 104. Processor 104 may be an application specific integrated circuit (ASIC), such as a general-purpose processor, a graphic processor, a microcontroller, or an application specific custom processor. Processor 104 may be implemented using reconfigurable digital systems, such as programmable logic devices (PLDs) and/or field programmable gate arrays. Processor 104 may also represent one or more processing devices, such as a circuit board including a general-purpose processor and a mathematical co-processor.

The monitoring payload 102 may also include a memory 106. Memory 106 may represent volatile processing memory (e.g., random access memory devices (RAMs)) and non-volatile storage memory (e.g., hard disks, magnetic storage, optical storage, and solid-state disk drives (SSDs)). The memory 106 may include instructions that may be executed by the processor 104 to perform monitoring and/or control functions, as discussed herein. The instructions may include communication instructions that may be used to monitor and/or control an IED. The instructions may cause the processor to parse data received from the IED (e.g., a regularly transmitted information broadcast by the IED). The instructions may include handshake data exchanges to identify a type and/or a model of the IED. The instructions may include identifying a status of the IED. The instructions may include local processing of received data and/or generation of a command to be transmitted to the IED. The instructions may also include other strategies for general operation of the payload, as discussed herein.

The payload 102 may include a communication system 105 that may include protocol circuitry 107, a receiver 110, and a transmitter 112. In some embodiments, receiver 110 and transmitter 112 may be integrated in a single transceiver device. The communication system 105 may be used to establish a link with IEDs and/or a ground-based system. Communication with IEDs may be used to retrieve data related to status of the electrical equipment managed by the IEDs. Data received from IEDs may relate to the status of IEDs and/or associated electrical equipment (e.g., number of faults, fault statuses, open reclosers, opened circuit breakers) and/or the electrical load (e.g., current, voltage, wattage) monitored by the IED. Communication with IEDs may be used to transmit control instructions to the IEDs. Examples of control instructions include adjustments to shift electrical loads, changes to the states of reclosers or circuit breakers (e.g., via the recloser control or the relay), and/or requests to retrieve additional diagnostic data (e.g., logs, historical series, peak currents or voltages). Communication with a ground-based system may be used to provide the monitoring payload 102 with additional processing power from the ground-based system. In some situations, the ground-based system may have data related to the position of the unmanned vehicle, which can facilitate identification of the location of the IEDs.

Figure 3:
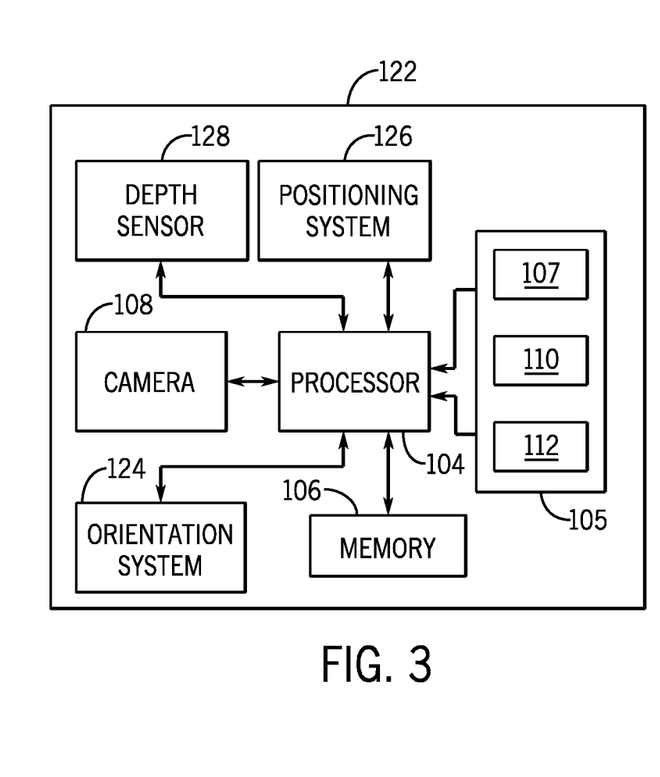
FIG. 3 is a block diagram of a modular diagnostic payload device that may be used in conjunction with unmanned aircraft to monitor or control IEDs in real time, in accordance with an embodiment of the present disclosure.

FIG. 3 provides a block diagram of an embodiment of a monitoring payload 122 that may be used for real time operation. The monitoring payload 122 may include a processor 104, memory 106, and a communication system 105 having the protocol circuitry 107, receiver 110, and transmitter 112, which may be similar to the monitoring payload 102 of FIG. 2. The monitoring payload 122 may also include a camera 108 (e.g., a camera system) to capture visual data associated with the IEDs in its field of view. When in use, the monitoring payload 102 may use the camera 108 to collect images for monitoring purposes. The visual data collected by the camera 108 may be processed by processor 104, stored in the memory 106, or transmitted to a ground-based system using the transmitter 112.

In general, the features in a captured image may be used to facilitate identification of the IEDs in the field of view of the image and to perform further processing and/or control. To that end, payload 122 may detect visual indications of the status of the IEDs to facilitate identification diagnostic operations and compare the collected data with a local database disposed in the memory 106 to determine the type of IED and/or the type of fault. The processor 104 may also tag the visual data with metadata containing information related to the IEDs in the field of view of an image. The metadata may include the type of IEDs (e.g., IED device type), the location of IEDs (e.g., geolocation), and/or the status of the IEDs. The metadata may be generated after collection and processing of the visual data. As an example, the processing circuitry may process an image to capture a feature (e.g., a shape, a barcode, a QR code) and determine the IED device type based on the feature to incorporate as metadata. In this example, the processing circuitry may re-process the image to search for a visual indication of the status (e.g., a color-coded indicator, a light indicator, a blinking pattern indicator), which may further encoded as metadata. In some embodiments, the re-processing may take place in view of the previous determination of the type of IED.

In order to facilitate operations using the camera 108, the monitoring payload 122 may further include an orientation system 124, a positioning system 126, and/or a depth sensor 128. The orientation system 124 may include one or more inertial sensors and/or magnetic sensors that may be used by the processor 104 to determine the relative position of the monitoring payload 122. For example, the orientation system 124 may be used to determine a horizon (i.e., the horizontal plane), a vertical direction, or any rotation that may be taking place during the capture of images with the camera 108. The data captured may be used to identify landmark references (i.e., geolocations) in the captured images, which may be compared with information in the geolocation database or dataset to facilitate the process of identification of IEDs.

The positioning system 126 and the depth sensor 128 may be used in conjunction to further facilitate identification and/or location of the IED. The positioning system 126 may be a global positioning system (GPS) or any other satellite-based positioning system. The positioning system 126 may be cellular-based positioning system that may rely on communication with neighboring cellular antennas. The positioning system 126 may provide an identification of the current geolocation of the unmanned aircraft or payload. The processor 104 may receive data from the positioning system 126 to determine the location of the monitoring payload 122 during data capture.

The depth sensor 128 may be any system used to gauge the distance between the monitoring payload 122 and the IED. Examples of depth sensors 128 may include parallax-based depth sensors, which may employ two different cameras at a known, fixed distance. To determine the distance, the processor may identify parallax (i.e., shift) of features of the IEDs in the field of view and the distance between the two cameras to determine the distance to the IEDs. In some embodiments, a parallax-based depth sensor may be integrated with the camera 108. Depth sensor 128 may be a projection-based depth sensor. In such system, the depth sensor 128 may project a lattice or an image onto a target IED and measure the distortion of the lattice or image to determine the distance to the IED. A projection-based depth sensor 128 may employ visible light or non-visible radiation (e.g., infrared, ultraviolet). The projection may employ high intensity focused light beams or lasers. The depth sensor 128 may be used to determine distances on the order of magnitude of a few miles. With data from the positioning system 126 and from the depth sensor 128, the processor 104 may determine the geolocation of the IEDs in its field of view. As such, the use of the depth sensor 128 may increase the reach of the monitoring payload 122 by several miles.

During operation, the monitoring payload 122 may collect images for monitoring purposes. The visual data collected by the camera 108 may be processed by processor 104, stored in the memory 106, or transmitted to a ground-based system using the transmitter 112. In some embodiments, the visual data may be tagged with metadata with information related to the IEDs in the field of view of an image. The metadata may relate to the type of IEDs, the location of IEDs, the status of the IEDs, and/or the type of fault identified in the IEDs.

In the monitoring payload 122, the memory 106 may include instructions that may be executed by the processor 104 to perform monitoring and/or diagnostic functions, as discussed herein. The instructions may include image-processing instructions that may detect identifying features of a captured image to facilitate identification of the IEDs in the field of view of the image. The instructions may include image-processing instructions that may detect visual indications of the status of the IEDs to facilitate identification diagnostic operations. The instructions may include data retrieval to compare the processed and/or collected data with a local database disposed in the memory 106 to determine the type of IED and/or the type of fault.

Furthermore, the instructions may include positioning calculating instructions that may process data from the orientation system 124 and/or the positioning system 126 to determine the location of the monitoring payload 122. The instructions may include depth-calculation instructions that may process data from the depth sensor 128 and/or camera 108 to determine the distance to the IED in the field of view. The instructions may include an IED location calculation that may process distance data and monitoring payload data to calculate the location of the IED in the field.

As an example, the processor 104 may process an image to capture a feature (e.g., a shape, a barcode, a QR code) and determine the IED device type based on the feature. The processing circuitry may re-process the image to search for a visual indication of the status (e.g., a color-coded indicator, a light indicator, a blinking pattern indicator). In some embodiments, the re-processing may be directed by the previous determination of the type of IED. The depth sensor 128 may facilitate the identification of the IED device type and/or status by providing amplification information for image processing (i.e., the processor 104 may perform a magnification operation of the image based on data obtained from the depth sensor 128).

The communication system 105 may be used to establish a link with the IED and/or a ground-based system, as discussed above with respect to monitoring payload 102. It should be noticed that the visual information collected by the camera 108 and/or depth sensor 128 may be used in conjunction with data acquired through the communication system 105 to perform monitoring and/or diagnosis. For example, in some situations, an IED may be faulty and fail to establish a data link with a neighboring IED or with the communication system 105. In such situation, the visual data may be used to determine the state of the non-responsive IED. In some situations, the monitoring payload 122 may be used to transmit a diagnostic instruction (e.g., a hard reset instruction) to the IED based on information obtained from the visual indicators.

Figure 4:
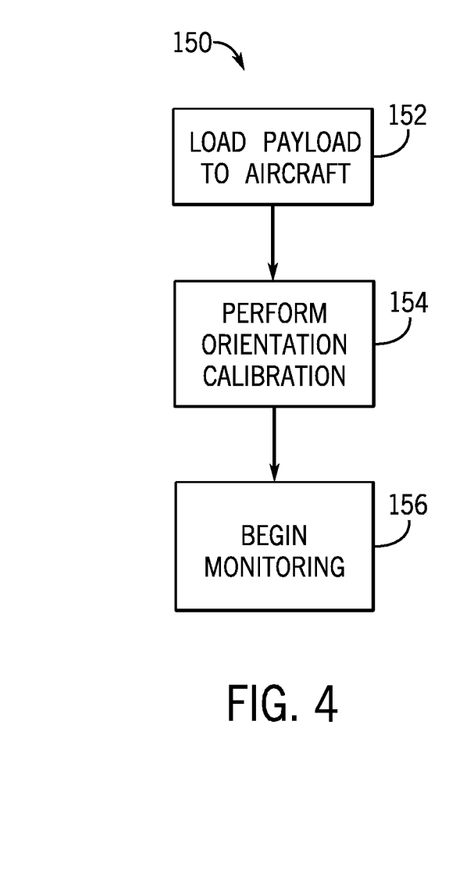
FIG. 4 is a method for loading a modular diagnostic payload device, in accordance with an embodiment of the present disclosure.

With the foregoing in mind, FIG. 4 illustrates a method 150 for use of modular monitoring payloads, such as the ones described above. The use of a modular monitoring payload may be advantageous to adapt existing unmanned aircrafts to perform monitoring. In a process block 152, the user may load the modular payload to the aircraft. In a process block 154, the modular payload may perform an initialization process to determine the relative position and orientation between the monitoring payload and the unmanned aircraft. For example, an angle of orientation may be determined using an orientation system 124 to generate a horizontal direction, which may be used for processing of data and/or by a positioning system 126. Following the initialization process, the monitoring payload is ready to perform monitoring operations in process block 156.

Figure 8:
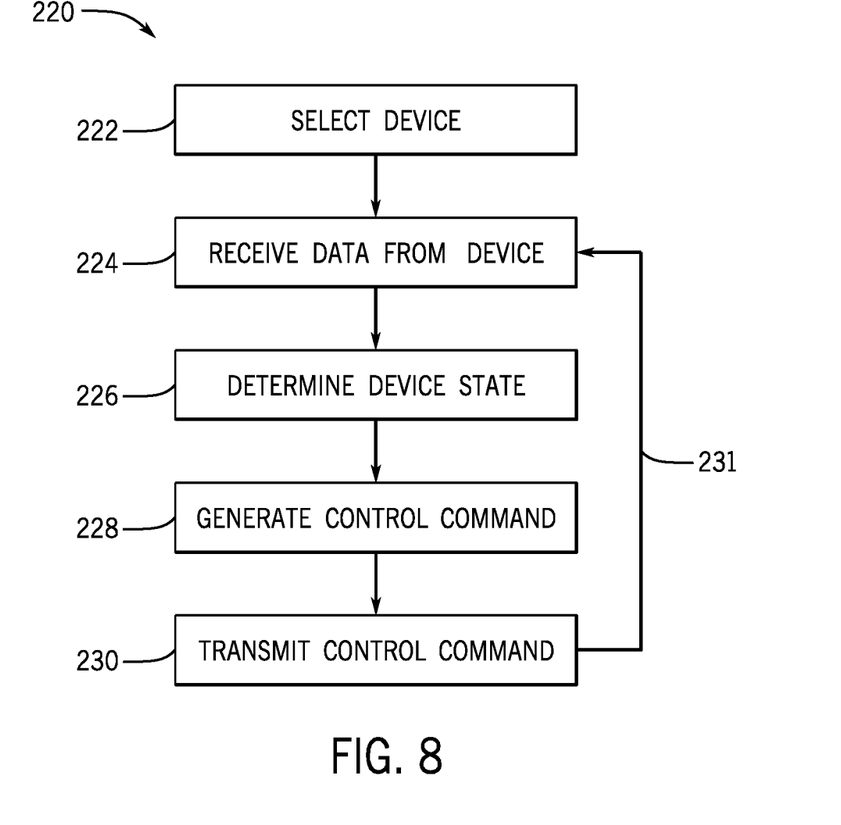
FIG. 8 is a method for performing monitoring and/or control of IEDs, in accordance with an embodiment.

FIG. 8 illustrates a method 220 that can be performed by the monitoring payload for autonomous and/or real-time monitoring. In a process block 222, a target region having one or more intelligent power transmission devices may be chosen. The payload may request the unmanned vehicle to move within communication distance (e.g., less than 10 feet, less than 10 yards, less than a mile, less than 10 miles) of the chosen intelligent power transmission device associated with that target region. In a process block 224, the monitoring payload may establish a data link with the intelligent power transmission device and collect data. The data link may employ any data transmission protocol, including GSE protocols (e.g., GOOSE data, GSSE data), internet protocols, near-field communication protocols, Bluetooth communication, proprietary protocols of the power transmission device, or any other protocol implemented in protocol circuitry of the power transmission device. In some embodiments, the data link may include a handshake process initiated by the payload, and the data may be transmitted by the intelligent power transmission device following the handshake. In some embodiments, the data link may be established by transmission of a data request or a status request from the payload. In some embodiments, the power transmission device may regularly broadcast data and the payload may collect the broadcast data.

In a process block 226, the monitoring payload may determine the state of the device. To that end, the payload may parse the collected data. In some situations, the collected data may include a status indication generated by the power transmission device. For example, the data transmitted by the power transmission device may include a flag message specifying the state of the power transmission device. In some situations, the collected data may be processed to identify the state of the power transmission device. For example, the data transmitted by the power transmission device may include values (e.g., historical chart, peak values, bottom values, current values) for the load, power, voltage, or current of the transmission device. The payload may process the received data to determine averages, maximums, minimums, percentile values, and/or other statistics. The payload may compared the resulting statistics or the received values with thresholds that may be associated with states. For example, the payload may determine that a power transmission device is faulty if a peak voltage exceeds a fault tolerance threshold, or may determine excess load state if an average exceeds a load threshold.

In a process block 228, the monitoring payload may determine a control command to be transmitted to the power transmission device. The monitoring payload may generate a control in response to the status determined in the process block 226. In some embodiments, the control command may be obtained from a look-up table or an artificial intelligence system (e.g., an expert system, a machine-trained system, a trained neural network) that takes a type of the power transmission device and the status as input. The processing may also take into account the status of the power distribution system. It should be noted that the processing performed in processing blocks 226 and 228 may be performed with assistance of ground-based processing system. To that end, the payload may communicate with a ground base system and exchange data. Ground-based assisted processing may be used to increase the processing power for the monitoring and control functionality and to decrease the power consumption of the processing circuitry in the payload. In a process block 230, the monitoring payload may transmit the control command to the power transmission device. The monitoring payload may request further data from the device for further monitoring and/or control (process 231).

Figure 5:
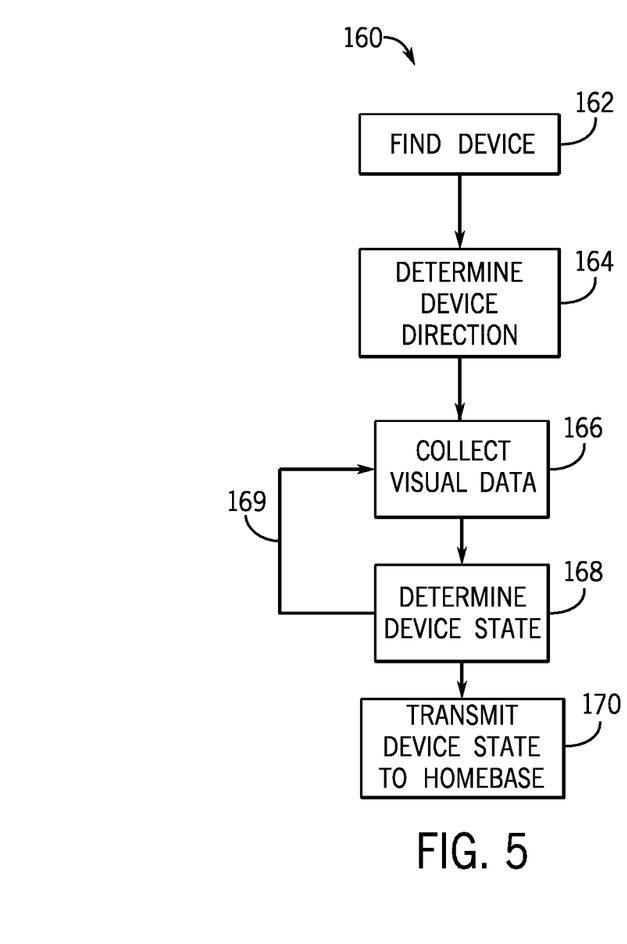
FIG. 5 is a method for performing visual monitoring of IEDs, in accordance with an embodiment.

FIG. 5 illustrates a method 160 that can be performed by the monitoring payload for autonomous monitoring using visual data. In a process block 162, a target region neighboring the monitoring payload and/or the unmanned aircraft may be chosen. The target region may have one or more IEDs. The region may be identified based on a command received from a ground-based controller and/or using a positioning system of the payload. The unmanned aircraft may orient the monitoring payload towards the target region, to collect data related to IEDs in process block 164. To that end, the unmanned vehicle may position itself such that the field of view of the camera component of the monitoring payload device includes the IEDs.

In process block 166, the monitoring payload may collect one or more images in its field of view. In a process block 168, the monitoring payload may determine the state of the one or more IEDs in the field of view. To that end, the monitoring payload may identify visual features that identify an IED. Moreover, for each identified IED, the monitoring payload may identify a visual indication of the corresponding status of the respective IED. In some situations, a recursion request 169 may be performed to improve the quality of the collected visual data. For example, if a collected image does not contain sufficient information for proper identification due to, for example, inadequate focus or cropping, the IED may request a new image of the region using recursion request 169. In process block 170, the monitoring payload may report the collected information to a ground-based system. In some embodiments, the monitoring payload or the unmanned aircraft may reposition itself close to a ground-based system for reporting.

Figure 6:
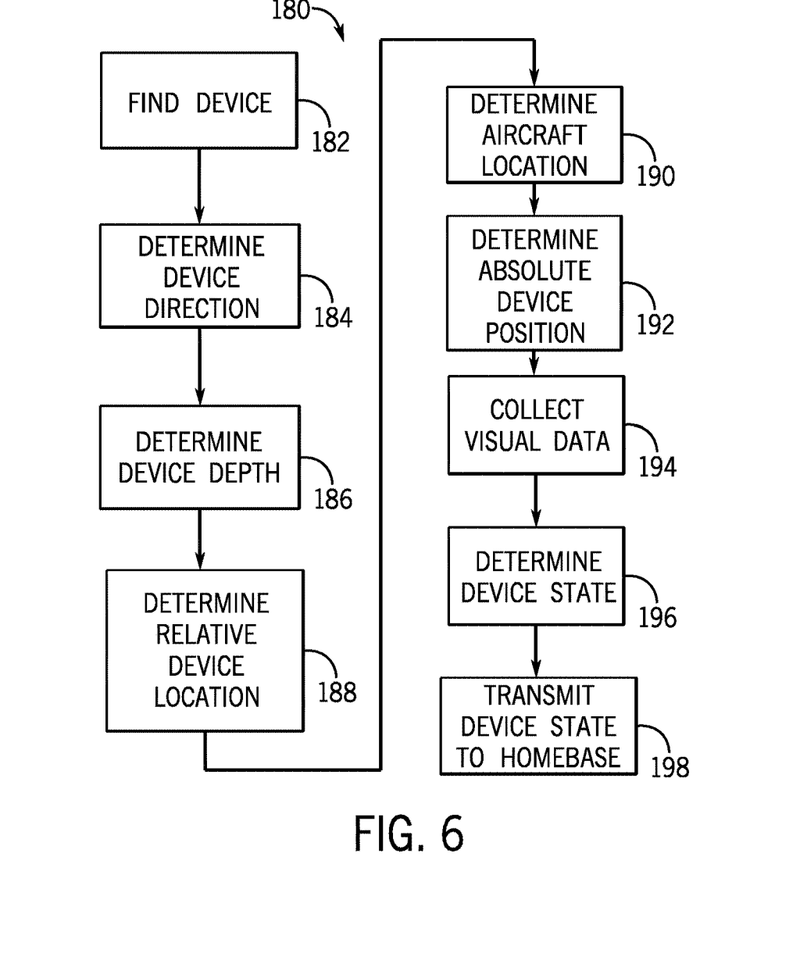
FIG. 6 is a method for performing real time visual monitoring, in accordance with an embodiment.

FIG. 6 illustrates a method 180 that can be performed by the monitoring payload for real time monitoring using visual data. In a process block 182, a target region neighboring the monitoring payload and/or the unmanned aircraft may be chosen. The target region may have an IED. The target region may be selected using the positioning system and/or the orientation system of the monitoring payload. In some embodiments, the target region may be selected using IED data stored in the memory of the payload. In some embodiments, the target region may be selected by navigating along a pre-programmed route. The monitoring payload may be oriented towards the IED by the unmanned aircraft, or by the monitoring payload itself in the process block 184. Orienting the monitoring payload may cause the IEDs in the target region to get in the field of view of the monitoring payload instruments (e.g., depth sensor, camera).

In process block 186, the monitoring payload may determine the distance to the IEDs using a depth sensor, as discussed above. In process block 188, the monitoring payload may, using the orientation data of the monitoring payload and the distance data collected using the depth sensor, determine relative location data of the IED. The relative location data may be data representative of a vector that indicates the distance and the direction of the IED relative to the monitoring payload. In process block 190, the monitoring payload may record its location using data collected from the positioning system. In block 192, the monitoring payload may determine an absolute location for the IED. The absolute location may be used to generate metadata for monitoring. The absolute location may be used to determine the type of IED, in conjunction with IED data stored in the memory of the payload.

In process block 194, the monitoring payload may collect one or more images in its field of view. In a process block 196, the monitoring payload may determine the state of the IED being inspected. To that end, the monitoring payload may identify visual features that identify an IED. The monitoring payload may employ data that indicates the type of IED to facilitate the identification of the IED. The monitoring payload may further identify a visual indication of the corresponding status of the IED. In process block 198, the monitoring payload may report the collected information to a ground-based system. In some embodiments, the monitoring payload or the unmanned aircraft may reposition itself close to a ground-based system for reporting.

Figure 7:
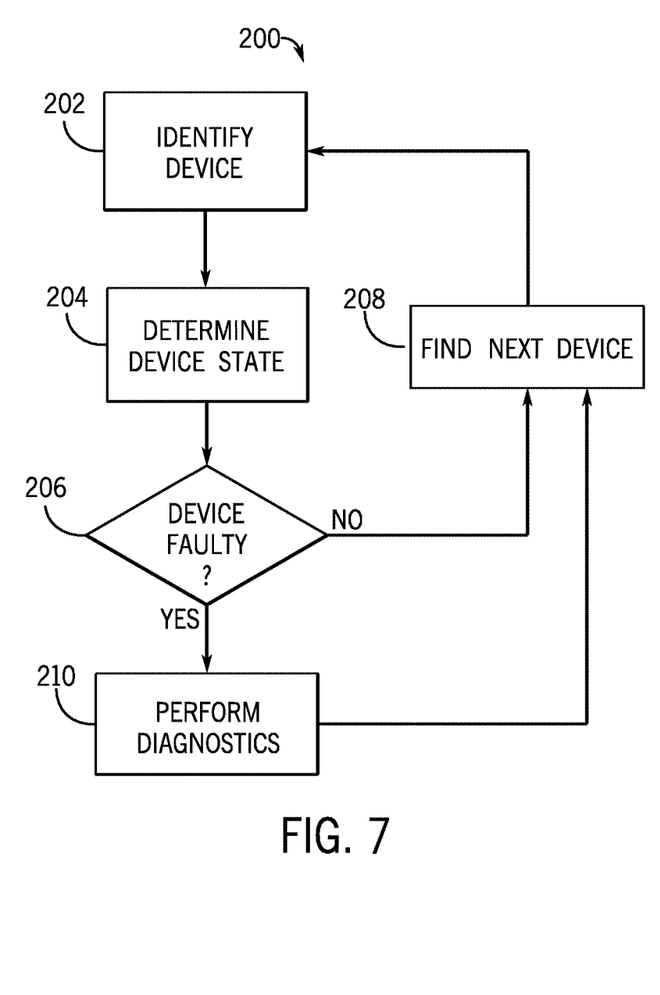
FIG. 7 is a method to perform fully autonomous real time device monitoring and/or control, in accordance with an embodiment.

FIG. 7 illustrates a method 200 that can be performed by an autonomous monitoring payload to find faulty equipment in a region having several IEDs. The method 200 may be used in conjunction with methods 160 of FIG. 5 and 180 of FIG. 6. In method 200, the monitoring payload may be used to cover a wider region that may have faulty equipment. For example, during a weather-related emergency situation, an IED on a branch of a power transmission system may detect a fault on a power line. In such situation, the monitoring payload, on board of an unmanned aircraft, may inspect the IEDs along the branch to identify the specific location of the fault. In a process block 202, the monitoring payload may identify an IED in the requested region. The identification of the device may include a determination of whether a power system device is an IED. In process block 204, the monitoring payload may determine. To that end, the monitoring payload may establish a data link with the IED.

In decision block 206, the monitoring payload may determine whether the IED is faulty based on the state information collected. If the IED does not required further monitoring (e.g., no fault at the IED or the electrical equipment monitored by the IED), the monitoring payload may seek the next IED to be inspected, in process block 208. In some situations, the IED may be within communication range of the monitoring payload and, thus, the unmanned vehicle does not move in process block 208. In some situations, the monitoring payload may be repositioned for inspection of the next IED. Upon identifying that an IED is faulty (i.e., the IED status displays a fault), in decision block 206, the unmanned vehicle may perform further diagnostics in process block 210. Diagnostics may include returning to the home base (e.g., a ground-based location) to report the fault and/or generate diagnostic commands for IEDs, as discussed above. This method allows for quick identification, management, and/or troubleshooting of failures in a power distribution system that may cover an expansive geographical region.

In some embodiments, the IED may communicate fault information of the power system to the monitoring payload via the RF link and RF communication protocols described above. For example, the fault information may include voltages, currents, or circuit breaker status information of the power lines monitored by the IED. As another example, the fault location information may be a distance and/or direction to a fault on a power line from the IED or another IED. The monitoring payload may, using the visual inspection processes described herein, determine a cause of the power line (e.g., environmental causes, power lines contacting other power lines, faulty equipment, etc.). In some embodiments, the monitoring payload may confirm, from the fault information of the IED, a type of fault (e.g., line-to-line, line-to-ground, etc.), the distance to the fault, and/or the direction to the fault to reduce downtime of the electrical equipment (e.g., power lines) by allowing operators to quickly respond to the confirmed location and/or cause of the fault with the proper tools and/or methods for the location. Further, the monitoring payload may communicate, via the RF link the confirmation to the IED and/or to a central monitoring station to allow operators to respond. That is, the IED may communicate the location of a potential fault based on the voltages and/or currents monitored by the IED, and the monitoring payload may visually confirm the fault location, type, and/or cause visually using the visual detection methods described above.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A payload device, comprising:
processing circuitry;
a communication system; and a memory device comprising a power device dataset that comprises diagnostic control commands for intelligent electronic devices (IEDs) and instructions that cause the processing circuitry to:

identify a first IED attached to a power system;

position the payload device within a communication distance of the first IED to allow for communication with the first IED using the communication system;

establish a data link with the first IED using the communication system;

receive fault information over the data link using the communication system;

visually inspect at least one power device communicatively coupled to the first IED at a fault location from the fault information to visually confirm the fault location from the fault information; and     communicate confirmation that a fault is present at the fault location when the payload device visually confirms the fault location from the fault information, thereby allowing operators to respond to the fault location.

2. The payload device of claim 1, wherein the memory device comprises instructions that cause the processing circuitry to:

determine a diagnostic command based on the monitoring data, the power device dataset, and a type of IED using the processing circuitry; and     transmit the diagnostic command to the first IED.

3. The payload device of claim 1, wherein determining the status of the at least one power device comprises calculating a maximum, a minimum, an average, a median, a percentile, or any combination thereof.

4. The payload device of claim 1, where the at least one power device comprises the first IED.

5. The payload device of claim 4, wherein the data link comprises a substation protocol, and wherein determining the status of the at least one power device comprises parsing the monitoring data.

6. The payload device of claim 5, wherein the substation protocol comprises Generic Object Oriented Substation Events (GOOSE) data or Generic Substation State Events (GSSE) data, or both.

7. The payload device of claim 1, comprising a positioning system, wherein the power device dataset comprises a plurality of geolocations, and wherein the memory device comprises instructions to:

collect a current geolocation of the payload device using the positioning system; and     determine a first geolocation of the at least one power device based on the current geolocation of the payload device and a first depth measurement.

8. An unmanned vehicle comprising:

processing circuitry;

a communication system comprising protocol circuitry configured to exchange data with a plurality of intelligent electronic devices (IEDs); and a memory device, comprising a power device dataset that comprises control commands for IEDs of the plurality of IEDs and instructions that cause the processing circuitry to:

identify a first IED attached to a power system;

position the unmanned vehicle within a communication distance of the first IED to allow for communication with the first IED via the communication system;

establish a radiofrequency (RF) link with the first IED using the communication system;

receive fault information over the RF link using the communication system; and     visually inspect at least one power device communicatively coupled to the first IED at a fault location from the fault information to visually confirm the fault location from the fault information; and     communicate confirmation that a fault is present at the fault location when the unmanned vehicle visually confirms the fault location from the fault information, thereby allowing operators to respond to the fault location.

9. The unmanned vehicle of claim 8, comprising a modular payload that comprises the processing circuitry, the communication system, and the memory device.

10. The unmanned vehicle of claim 8, comprising a positioning system, wherein the power device dataset comprises a plurality of geolocations, and wherein the instructions cause the processing circuitry to request the unmanned vehicle to position itself within the communication distance using a current geolocation obtained from the positioning system.

11. The unmanned vehicle of claim 8, wherein the protocol circuitry is configured to employ a substation protocol.

12. The unmanned vehicle of claim 11, wherein the substation protocol comprises Generic Object Oriented Substation Events (GOOSE) data or Generic Substation State Events (GSSE) data, or both.

13. The unmanned vehicle of claim 8, wherein the first IED comprises a relay, a fault- and load-receiver, or a faulted circuit indicator.

14. The unmanned vehicle of claim 8, wherein the unmanned vehicle comprises an unmanned aircraft, wherein the memory device comprises instructions that cause the processing circuitry to cause the unmanned aircraft to return to a ground-based station if the status of the at least one power device comprises a failure.

15. The unmanned vehicle of claim 8, wherein the power device dataset comprises a look-up table or a trained artificial intelligence system.

16. The unmanned vehicle of claim 8, wherein the memory device comprises instructions that cause the processing circuitry:

determine a first protocol of the first IED based on a first IED type and the power device dataset; and     establish the RF link using the first protocol.

\* \* \* \* \*